(12) United States Patent
Donth

(10) Patent No.: US 8,813,529 B2
(45) Date of Patent: Aug. 26, 2014

(54) ANTI-THEFT DEVICE FOR INVERTERS

(75) Inventor: Andreas Donth, Edermuende (DE)

(73) Assignee: SMA Solar Technology AG, Niestetal (DE)

( * ) Notice: Subject to any disclaimer, the term of this patent is extended or adjusted under 35 U.S.C. 154(b) by 253 days.

(21) Appl. No.: 13/267,183

(22) Filed: Oct. 6, 2011

(65) Prior Publication Data

US 2012/0026660 A1 Feb. 2, 2012

Related U.S. Application Data

(63) Continuation of application No. PCT/EP2010/003116, filed on May 20, 2010.

(30) Foreign Application Priority Data

May 25, 2009 (DE) .................... 20 2009 007 413 U

(51) Int. Cl.
*B65D 55/14* (2006.01)

(52) U.S. Cl.
USPC ............ 70/164; 70/232; 70/52; 70/54; 70/55; 70/56; 109/51; 109/52; 292/148; 292/205; 361/622

(58) Field of Classification Search
USPC ............ 361/474, 625, 622; 70/14, 58, 52, 54, 70/55, 56, 164, 232; 109/50, 51, 52; 292/148, 205
See application file for complete search history.

(56) References Cited

U.S. PATENT DOCUMENTS

| | | | | |
|---|---|---|---|---|
| 3,613,411 | A | * | 10/1971 | Crump ............................ 70/232 |
| 3,791,683 | A | * | 2/1974 | Bright ............................ 292/32 |
| 3,938,837 | A | * | 2/1976 | Bright ........................... 292/149 |
| 4,530,531 | A | | 7/1985 | Mantini |
| 5,092,143 | A | * | 3/1992 | Rumbles ......................... 70/56 |
| 6,006,556 | A | * | 12/1999 | Daoud ............................ 70/56 |
| 6,047,574 | A | * | 4/2000 | Kozlowski et al. ............. 70/259 |
| 6,308,996 | B1 | * | 10/2001 | Ganimian ................. 292/259 R |
| 6,578,392 | B1 | | 6/2003 | Bowman et al. |
| 7,059,019 | B1 | * | 6/2006 | Klingler ......................... 16/319 |
| 7,346,970 | B2 | * | 3/2008 | Stoger ..................... 29/243.521 |
| 8,446,723 | B2 | * | 5/2013 | Goza ............................ 361/692 |
| 2005/0252256 | A1 | * | 11/2005 | Escalante, III .................... 70/14 |
| 2006/0198110 | A1 | * | 9/2006 | Hunkeler et al. ............. 361/747 |
| 2007/0079638 | A1 | * | 4/2007 | Leung ............................. 70/95 |
| 2008/0034819 | A1 | * | 2/2008 | DeWalch ........................ 70/164 |

(Continued)

FOREIGN PATENT DOCUMENTS

DE 202007003242 U1 5/2007

OTHER PUBLICATIONS

International Search Report dated Sep. 16, 2010 for Application No. PCT/EP2010/003116. 4 Pages.

*Primary Examiner* — David M Sinclair
*Assistant Examiner* — Robert Brown
(74) *Attorney, Agent, or Firm* — Eschweiler & Associates, LLC

(57) ABSTRACT

Anti-theft device for an inverter assembly including an inverter having a housing with a rear panel, a mounting plate to which the inverter is attached and a locking pin connected at one end to the mounting plate and extending through a hole in the rear panel of the inverter housing when the inverter is in a mounted position, wherein the locking pin includes an opening at the other end through which a U-lock can be inserted.

20 Claims, 2 Drawing Sheets

(56) References Cited

U.S. PATENT DOCUMENTS

| | | | |
|---|---|---|---|
| 2008/0186686 A1* | 8/2008 | Buck et al. | 361/747 |
| 2010/0124473 A1* | 5/2010 | Hoshino et al. | 411/379 |
| 2010/0246142 A1* | 9/2010 | Phillips et al. | 361/747 |
| 2010/0277875 A1* | 11/2010 | Moorehead et al. | 361/747 |
| 2011/0273852 A1* | 11/2011 | Debrody et al. | 361/747 |
| 2012/0014072 A1* | 1/2012 | Trussel et al. | 361/747 |

* cited by examiner

ANTI-THEFT DEVICE FOR INVERTERS

REFERENCE TO RELATED APPLICATIONS

This application is a continuation of International Application No.: PCT/EP/2010/003116, filed May 20, 2010, which claims priority to German Patent Application No.: 202009007413.7, filed May 25, 2009.

FIELD

The present invention relates to an anti-theft device for an inverter wherein a mounting plate is provided for attaching the housing of the inverter onto a wall or, more specifically, a building, and wherein the housing itself features a rear panel and at least one side panel.

BACKGROUND

As is commonly known, inverters serve to convert direct current into alternating current. Such inverters are used specifically in photovoltaic systems that may be installed in locations that are very difficult to monitor. As a result, theft is a common threat, not only with respect to solar cells and inverters, but even to entire roof-mounted PV systems. In other words, both photovoltaic cells and inverters may be affected by theft. This even holds true when said inverters are installed in buildings remote from residential areas, e.g. in barns. In light of this, it has partly become relatively difficult to insure these kinds of photovoltaic systems against theft.

Regarding photovoltaic cells, measures are already known for preventing or at least hindering their theft.

Inverters feature a housing that can be mounted onto a wall or a pole by means of a mounting plate. Note that a pole intended for use as a solar tree can hold a large number of photovoltaic cells.

DE 20 2007 003 242.0 U1 documents an anti-theft device for inverters that includes a mounting plate on which the housing of the inverter can be secured via a theft protection mechanism. In terms of specifics, the anti-theft device includes a U-shaped guide element on the mounting plate that is open on each side and a strap for securing a U-lock that is located at an angle to the area around the locking element. A screw inserted into the inverter housing can be found on the rear panel of the inverter. To attach the inverter to the mounting plate, the inverter is pushed onto the mounting plate from the side until the head of the screw is inside the U-shaped locking element. To secure against removal, a U-lock is provided whose shackle is inserted through a hole in the strap and which encompasses the screw as well. As a result, the housing cannot be pulled off the mounting plate from the side and furthermore the inverter cannot be lifted. Although the anti-theft device described here is extremely effective, it is also relatively expensive due to the large number of individual parts needed to manufacture it.

SUMMARY

The invention is directed to a device that protects against removal and theft and is cheaper to manufacture given the aforementioned state of technology yet still offers an effective way to prevent an inverter from being stolen.

The invention solves this task by including a locking pin in the mounting plate that protrudes through the rear panel of the housing and comprises an opening on the end facing the housing of the inverter for inserting the U-lock. A pin on the mounting plate with an opening at one end is all that is needed to secure the housing of the inverter and hence the inverter itself. For the second part of this anti-theft mechanism, a single U-lock is inserted through the opening of the locking pin once the inverter housing is attached.

Based on one feature of the invention, the mounting plate comprises a threaded element (e.g., a rivet nut) where the locking pin can be screwed in through a hole in the rear panel of the inverter housing. The locking pin is located near at least one side panel in such a way that it cannot rotate once the lock is inserted into it.

Even small inverters may have a weight of between 20 and 60 kg. Two people are usually necessary to manually attach the inverter to the wall of a building with the mounting plate. The inverter and its housing is placed onto the mounting plate from above. Once on the mounting plate, the inverter housing can be moved around somewhat for more precise alignment. A hole is located on both the rear panel of the inverter housing and the mounting plate and a threaded element such as a rivet nut is arranged (e.g., welded) onto the mounting plate directly behind the hole.

As explained above, mounting the inverter includes attaching the housing to the mounting plate from above. This may be called a mounted position. The inverter assembly comprises an inverter having a housing with a rear panel and at least one side panel, a mounting plate and a locking pin. Once the hole in the rear panel of the housing is aligned to be flush with the hole in the mounting plate, the screw thread of the locking pin is inserted into the threaded element (e.g., the rivet nut). After screwing the locking pin into the rivet nut, the U-lock is inserted through the opening at the opposite end of the locking pin. When the locking pin is directly adjacent to a side panel of the housing, the inserted U-lock prevents the pin from rotating any further. This means that the locking pin is secured by the inverter housing itself when the U-lock is attached. In another variant the locking pin is connected to the mounting plate. This applies insofar that, when mounting the inverter housing, care may be given to ensure that the hole in the rear panel of the inverter is flush with the locking pin on the mounting plate. Attaching the housing of the inverter to the mounting plate in such a way that the locking pin can go through the hole in the rear panel of the housing may be difficult due to the relatively heavy weight of the inverter. The task of mounting the inverter may be simplified by attaching it to a mounting plate that allows limited lateral movement since the weight of the inverter is held by the mounting plate itself as soon as the housing of the inverter is placed on the mounting plate.

BRIEF DESCRIPTION OF THE DRAWINGS

The drawings below offer a more detailed description of the invention.

DETAILED DESCRIPTION

Figure 1:
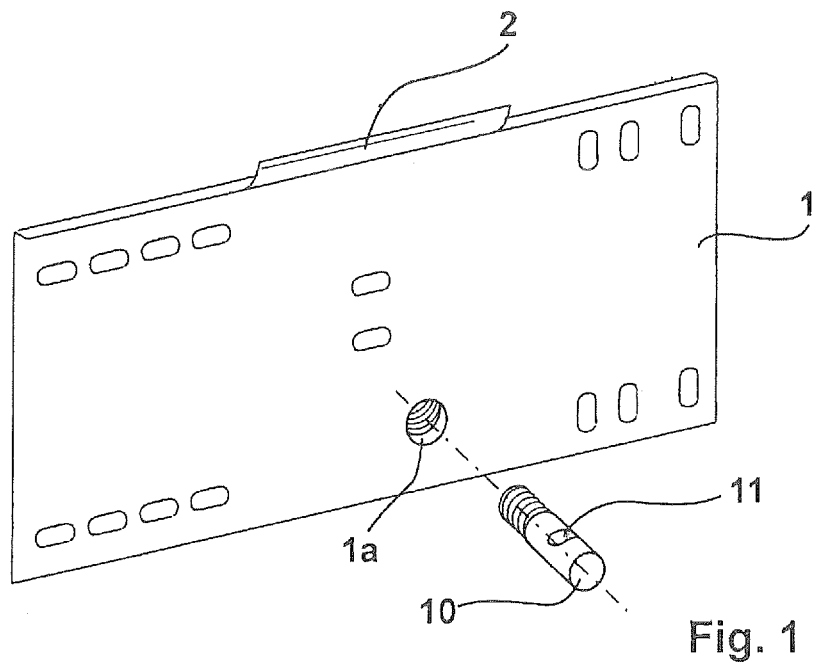
FIG. 1 illustrates a mounting plate from a perspective view.
Figure 2:
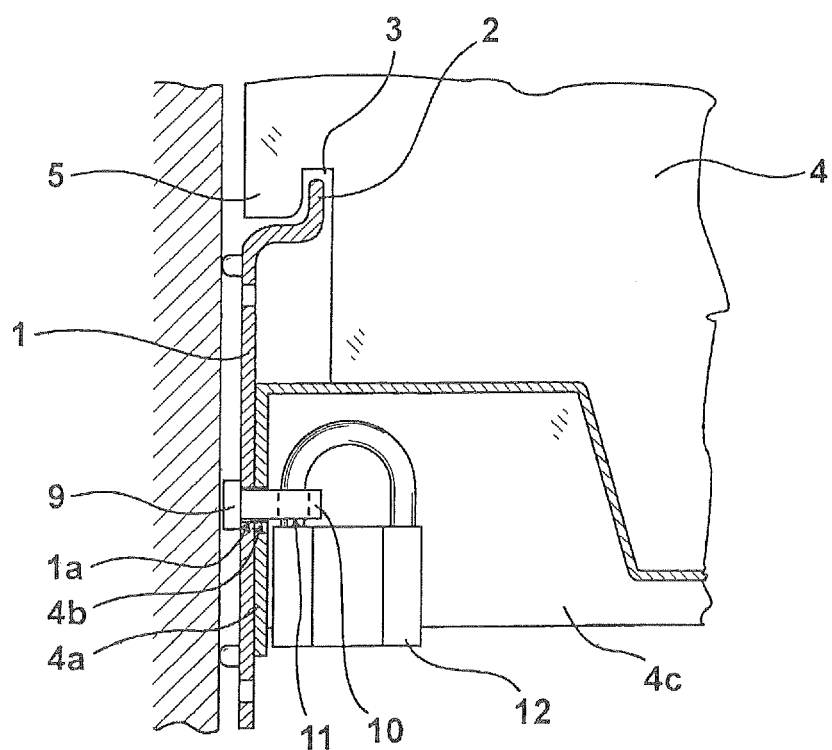
FIG. 2 is a side view of the inverter attached to the mounting plate.
Figure 3:
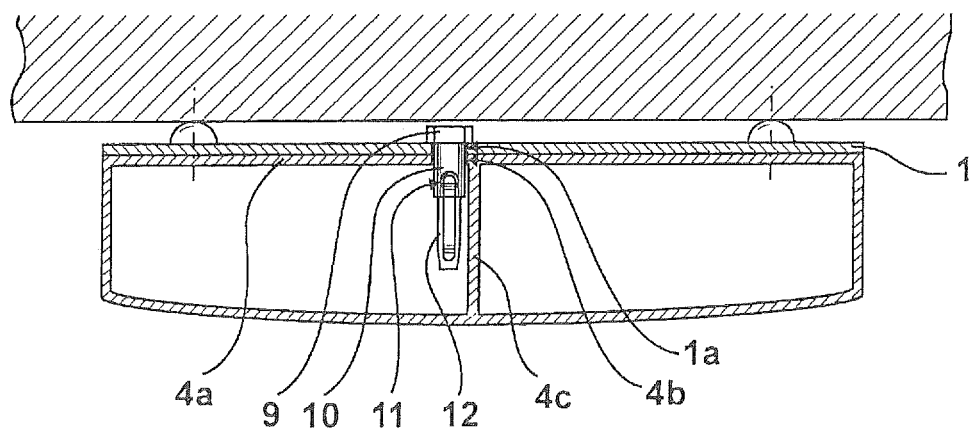
FIG. 3 is a top view of the inverter assembly, mounting plate and locking pin.

The mounting plate 1 according to FIG. 1 comprises a guide rail 2 on the upper end that runs at a distance from the top side of the mounting plate. In a corresponding manner, the housing 4 of the inverter has a U-shaped cutout 3 in the area of the rear panel while the bracket 5 in the housing 4 of the inverter engages the guide rail as shown in FIG. 2.

In one embodiment the housing of the inverter is secured via the locking pin 10. As depicted in FIG. 2, the mounting plate 1 features a hole 1a, whereby the rivet nut 9 is located behind the hole 1a. The rear panel 4a of the inverter housing 4 also features a hole 4b and the locking pin designated with 10 can be inserted through the hole 1a and the hole 4b into the rivet nut 9. The front end of the locking pin 10 (i.e., the end facing the inverter housing) has an opening 11 that is used to attach the U-lock 12 as depicted in FIG. 2. These kinds of pins with an opening on one end are available for purchase as eyebolts.

At this point the locking pin 10 is positioned in the housing 4 of the inverter so that it is directly adjacent to the side panel 4c of the inverter housing. In this case, direct proximity to the side panel 4c means that the locking pin 10 with inserted U-lock 12 cannot be removed from the rivet nut 9 if this is prevented by the directly adjacent side panel 4c. The side panel 4c of the inverter housing blocks the locking pin from rotating, when the U-lock is inserted.

When mounting the inverter or inverter housing, proceed in such a manner that the inverter is placed onto the mounting plate from above, i.e. onto the guide rail 2 of the mounting plate 1. Now screw the pin 10 into the rivet nut 9 when the hole 1a is flush with the hole 4b in the rear panel of the housing 4. Finally, insert the U-lock 12 into the pin.

What is claimed is:

1. An inverter assembly, comprising:
   an inverter having a housing with a rear panel;
   a mounting plate configured to attach the housing to a wall or fixture;
   a locking pin coupled to the mounting plate at one end of the locking pin, wherein the locking in selectively extends through a hole in the rear panel of the housing based on an orientation of the housing with respect to the mounting plate, and wherein the locking pin further comprises an opening at another end thereof, wherein a U-lock selectively secures the rear panel between the opening and the mounting plate based on an insertion of the U-lock into the opening, therein selectively securing the inverter to the mounting plate.

2. The inverter assembly according to claim 1, wherein the locking pin is fixedly attached to the mounting plate.

3. The inverter assembly according to claim 1, wherein the locking pin is selectively removable from the mounting plate.

4. The inverter assembly according to claim 1, wherein the locking pin comprises a screw thread at the one end that couples to the mounting plate.

5. The inverter assembly according to claim 1, wherein the locking pin comprises a screw thread at the one end, and wherein the opening at the another end is opposite the one end.

6. The inverter assembly according to claim 1, wherein the mounting plate comprises a threaded element.

7. The inverter assembly according to claim 1, further comprising a threaded element, wherein the locking pin extends through the hole in the rear panel of the inverter housing into the threaded element fixed at the mounting plate.

8. The inverter assembly according to claim 7, wherein the threaded element comprises a rivet nut.

9. The inverter assembly according to claim 1, wherein the hole in the rear panel of the inverter is positioned adjacent to at least one side panel of the housing, wherein the at least one side panel is configured to block the locking pin from rotating when the U-lock is inserted in the opening.

10. An inverter assembly, comprising:
    a mounting plate configured to be secured to a fixture, the mounting plate having a mounting plate hole associated therewith;
    an inverter housing having an inverter housing hole associated therewith; and
    a locking pin, wherein the locking in selectively passes through the mounting plate hole and the inverter housing hole, wherein the locking pin comprises an attachment component on one end local to the mounting plate wherein the attachment component couples the locking in to the mounting plate, and wherein the locking in comprises an opening on another, opposite end local to the inverter housing, wherein a U-lock selectively locks the inverter housing to the mounting plate based on a position of a shackle of the U-lock through the opening of the locking pin.

11. The inverter of claim 10, wherein the attachment component comprises a nut configured to threadingly engage the one end of the locking pin extending through the hole in the mounting plate.

12. The inverter of claim 10, wherein the mounting plate hole is threaded, and wherein the locking pin is threaded such that the locking pin is configured to threadingly engage the mounting plate hole.

13. The inverter of claim 10, wherein the mounting plate comprises a guide rail configured to engage a bracket portion of the inverter housing.

14. The inverter of claim 10, wherein the inverter housing comprises a side panel extending adjacent to the locking pin, wherein when the U-lock is inserted within the locking pin opening the side panel prevents the locking pin from rotating substantially.

15. An inverter assembly, comprising:
    an inverter, wherein the inverter comprises a housing having a rear panel, and wherein the rear panel comprises a thru-hole;
    a mounting plate in selective attachment with a wall or fixture, wherein the rear panel of the housing is in selective engagement with the mounting plate;
    a locking pin comprising a first distal end coupled to the mounting plate, wherein the locking pin further comprises a second distal end having an opening, wherein the second distal end is opposite to the first distal end, and wherein the locking pin selectively extends through the thru-hole in the rear panel of the housing based on the selective engagement of the housing with the mounting plate, therein positioning the rear panel between the opening of the locking pin and the mounting plate; and
    a U-lock having a shackle, wherein the shackle is selectively positioned through the opening of the locking pin, wherein the U-lock selectively locks the housing to the mounting plate based on the position of the shackle through the opening of the locking pin.

16. The inverter assembly of claim 15, wherein the first distal end of the locking pin further comprises a threaded portion, and wherein the mounting plate comprises a threaded element, wherein the first distal end of the locking pin is selectively threadingly engaged with the threaded element and is selectively removable from the threaded element, therein selectively coupling the locking pin to the mounting plate.

17. The inverter assembly of claim 16, wherein the housing further comprises a side panel extending adjacent to the thru-hole, wherein an engagement between the side panel and the U-lock generally prevents the locking pin from substantially rotating when the shackle is positioned through the opening of the locking pin.

18. The inverter assembly of claim 16, wherein the threaded element comprises a threaded rivet nut welded to the mounting plate.

19. The inverter assembly of claim 15, wherein the mounting plate further comprises a guide rail, wherein a bracket portion of the housing is in selective engagement with the guide rail.

20. The inverter assembly of claim 15, wherein the locking pin comprises a threaded eye bolt.

* * * * *

UNITED STATES PATENT AND TRADEMARK OFFICE
CERTIFICATE OF CORRECTION

PATENT NO. : 8,813,529 B2
APPLICATION NO. : 13/267183
DATED : August 26, 2014
INVENTOR(S) : Andreas Donth Page 1 of 1

It is certified that error appears in the above-identified patent and that said Letters Patent is hereby corrected as shown below:

In the Claims

Column 3, Claim 1, Line 35 Please replace "locking in" with --locking pin--
Column 4, Claim 10, Line 7 Please replace "locking in" with --locking pin--
Column 4, Claim 10, Line 11-12 Please replace "locking in" with --locking pin--
Column 4, Claim 10, Line 12 Please replace "locking in" with --locking pin--

Signed and Sealed this
Eighteenth Day of November, 2014

Michelle K. Lee
*Deputy Director of the United States Patent and Trademark Office*